United States Patent
Hong et al.

(10) Patent No.: US 12,519,820 B2
(45) Date of Patent: Jan. 6, 2026

(54) USER BASED THREAT RESPONSE RECOMMENDATIONS

(71) Applicant: Cisco Technology, Inc., San Jose, CA (US)

(72) Inventors: Yi Hong, Foster City, CA (US); Tian Bu, Basking Ridge, NJ (US)

(73) Assignee: Cisco Technology, Inc., San Jose, CA (US)

( * ) Notice: Subject to any disclaimer, the term of this patent is extended or adjusted under 35 U.S.C. 154(b) by 81 days.

(21) Appl. No.: 18/438,962

(22) Filed: Feb. 12, 2024

(65) Prior Publication Data

US 2025/0260712 A1  Aug. 14, 2025

(51) Int. Cl.
  *H04L 9/40* (2022.01)
(52) U.S. Cl.
  CPC ...... *H04L 63/1441* (2013.01); *H04L 63/1416* (2013.01)
(58) Field of Classification Search
  CPC ............ G06F 21/55–554; G06N 20/00; H04L 63/1416; H04L 63/1441–1491
  See application file for complete search history.

(56) References Cited

U.S. PATENT DOCUMENTS

| | | | |
|---|---|---|---|
| 10,721,264 | B1 | 7/2020 | Dell'Amico |
| 2018/0367561 | A1 | 12/2018 | Givental |
| 2020/0057953 | A1 | 2/2020 | Livny et al. |
| 2020/0067985 | A1* | 2/2020 | Bhargava ............ G06F 3/0481 |
| 2020/0329068 | A1 | 10/2020 | Findlay |
| 2020/0401696 | A1 | 12/2020 | Ringlein |
| 2021/0400077 | A1 | 12/2021 | Sites et al. |
| 2022/0067551 | A1* | 3/2022 | Wei ....................... G06N 5/046 |
| 2023/0094373 | A1 | 3/2023 | Muralidharan |
| 2023/0245651 | A1* | 8/2023 | Wang ..................... G06N 5/022 704/275 |

OTHER PUBLICATIONS

Market Segmentation, Amazon 2015-2023, retrieved Dec. 1, 2023 from <https://advertising.amazon.com/library/guides/market-segmentation>, 11 pages.
The Personas Chart: Use Clustering Analysis to Find Your Product's User Personas, Amplitude, retrieved Dec. 1, 2023 from <https://help.amplitude.com/hc/en-us/articles/235648588-The-Personas-chart-use-clustering-analysis-to-find-your-product-s-user-personas#:~:text=>, 4 pages.
International Search Report and Written Opinion for International Application No. PCT/US2025/011448, mailed May 12, 2025, 14 Pages.

* cited by examiner

*Primary Examiner* — Kevin Bechtel
(74) *Attorney, Agent, or Firm* — Lee & Hayes, P.C.

(57) ABSTRACT

Techniques described herein can generate customized, user-based security response recommendations for users of security system(s), such as for security analysts tasked with performing responses to computing security threats. A user-based response recommendation engine can generate the user-based security response recommendations based on incident data associated with security incidents and based on historical user response data. Furthermore, user role inference techniques can optionally be used in conjunction with the user-based response recommendation engine.

20 Claims, 12 Drawing Sheets

USER BASED THREAT RESPONSE RECOMMENDATIONS

TECHNICAL FIELD

The present disclosure relates generally to computing security, and to protecting network endpoints and other computing devices from security compromise in particular.

BACKGROUND

Today's computer systems face an ever-growing number of security threats. Attack surfaces have grown due to an increasing variety of device types and applications, and the number and variety of security threats has therefore grown as well.

An ongoing arms race exists between attacks and attack detection techniques. More detection is generally perceived as better security, and as a result, detection has become increasingly aggressive. However, increasingly aggressive detection can run the risk of introducing more false positives which can be a drain on valuable security resources.

Responding to security events is often complex and resource intensive. Security appliances deployed in a network and their associated policies can vary greatly. Making sense of different security events and then acting on such events is often tedious and requires deep knowledge and experience.

Moreover, different organizations may have different threat response policies and different available resources for computing security. An organization such as a bank may invest heavily in computing security and may impose stringent security policies. In contrast, a school may not need a similar level of computing security and may not have the same tools and resources as the bank.

Different security analysts within an organization can also be subject to different policies. Security analysts are also referred to herein as users due to their use of available security systems. More trusted or more highly skilled users may be allowed access to more sensitive information and more powerful tools than less trusted or less highly skilled users, and the more highly skilled users may likewise be subject to different security policies.

The complexity of effective security response can lead some companies to ignore security events or tune down detection sensitivity thresholds in order to save resources. Security can become compromised as proper event response becomes unaffordable, sometimes resulting in a waste of money invested in detection.

In view of the above, techniques are needed to make responding to security events more efficient and effective in part by efficiently and effectively determining different appropriate security responses for different security analysts within different organizations.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
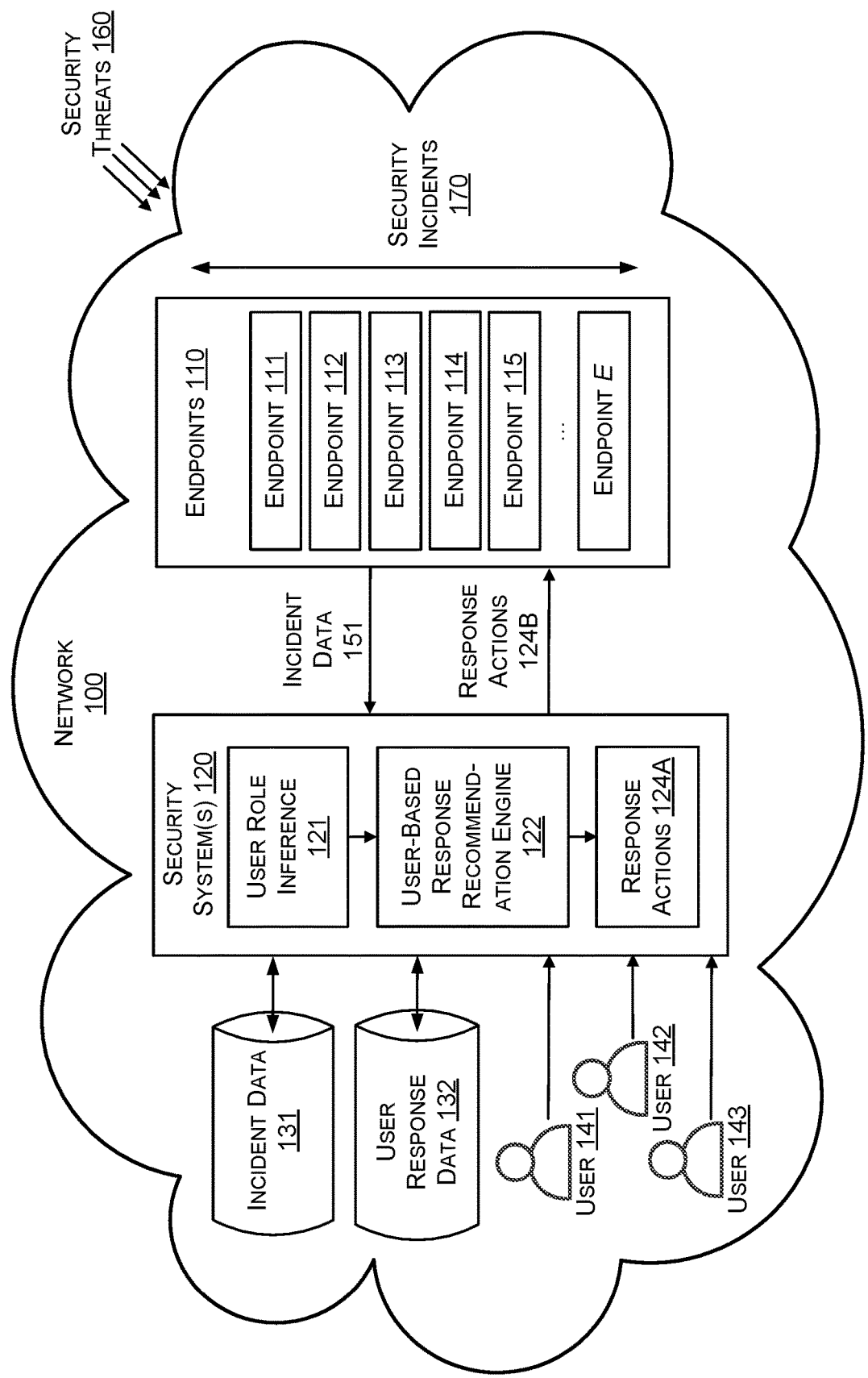
FIG. 1 illustrates an example network architecture including security system(s) adapted to generate and employ customized security response recommendations, in accordance with various aspects of the technologies disclosed herein.

This disclosure describes techniques that can be performed in connection with generating customized security response recommendations for different security analysts in different organizations. Example techniques can include techniques for inference of user roles based on behavioral clustering, techniques for generating user-based threat response recommendations, and combinations of thereof.

According to an example embodiment configured for inference of user roles based on behavioral clustering, a method can be performed by devices that provide a security system in a network. The method can include obtaining historical user response data associated with multiple users, wherein the historical user response data comprises indications of previous responses by the multiple users to previous security incidents, and clustering users of the multiple users based on the historical user response data, resulting in two or more different user clusters.

The clustering can comprise, for example, identifying, based on the historical user response data, a first common action pattern exhibited in historical user response data associated with a first two or more users of the multiple users, and including the first two or more users of the multiple users in a first user cluster of the two or more different user clusters. Similarly, a second common action pattern exhibited in historical user response data and associated with a second two or more users of the multiple users can also be identified based on the historical user response data. The second two or more users of the multiple users can be included in a second user cluster of the two or more different user clusters.

Labels can be identified and applied to the clusters. For example, the method can include identifying, based on the first common action pattern, a first user role label for the first user cluster, applying the first user role label to the first user cluster, identifying, based on the second common action pattern, a second user role label for the second user cluster, and applying the second user role label to the second user cluster.

According to an example embodiment configured for generating user-based threat response recommendations, further methods can be performed by devices that provide a security system in a network. The methods can include identifying, by a security system within a network, a security incident within the network, and generating, by the security system, a response recommendation for a user, wherein the response recommendation recommends a response by the user to the security incident.

Generating the response recommendation can comprise, for example, obtaining incident data associated with the security incident, and obtaining historical user response data associated with the user, wherein the historical user response data comprises indications of previous responses by the user to previous security incidents. Based on the incident data and the historical user response data, a probable response by the user to the security incident can be predicted. The response recommendation for the user can comprise the probable response.

The techniques described herein may be performed by one or more computing devices comprising one or more processors and one or more computer-readable media storing computer-executable instructions that, when executed by the one or more processors, cause the one or more processors to perform the methods disclosed herein. The techniques described herein may also be accomplished using non-transitory computer-readable media storing computer-executable instructions that, when executed by one or more processors, perform the methods carried out by the network controller device.

EXAMPLE EMBODIMENTS

In an example according to this disclosure, security system(s) can generate customized, user-based security response recommendations for users of the security system(s), such as for security analysts tasked with performing responses to security threats. A user-based response recommendation engine can generate the user-based security response recommendations based on incident data associated with security incidents and also based on historical user response data associated with users tasked with responding to the security incidents. Furthermore, user role inference techniques are disclosed herein which can optionally be used in conjunction with the user-based response recommendation engine. For example, the disclosed user role inference techniques can be used to in connection with user training or to avoid recommending ineffective security response actions.

The disclosed user-based response recommendation engine can generally operate by predicting user actions for responding to security incidents. The predicted actions can be used for recommending actions to users so that they are able to respond to security incidents more efficiently and effectively. The predicted actions can also optionally be used to build automated responses to security incidents in some embodiments.

In some examples, the problem of predicting user actions for responding to security incidents can be formulated as a supervised machine learning problem. Embodiments can train a supervised machine learning model to process inputs including both user features and security incident features, and the supervised machine learning model can output predictions of what actions a user may take in response to the security incident. The trained supervised machine learning model can comprise a decision function which maps user features and security incident features into a set of actions.

The operations of the trained supervised machine learning model are represented below:

$$f(\text{features}(\text{user}), \text{features}(\text{incident})) \rightarrow \text{a set of actions}$$

where features (user) can include a vector of user features, and features (incident) can include a vector of security incident features. These inputs are provided to the trained supervised machine learning model, and the trained supervised machine learning model can output a set of actions that the user is predicted to take in response to the security incident. The vector of user features can be extracted or generated from historical user response data associated with a user, e.g., from historical user response data comprising indications of previous responses by the user to previous security incidents. The vector of user features can therefore represent the user's behavior and habits for responding to security incidents. The vector of security incident features can be extracted or generated from any security incident data, e.g., from a name, description, or other data pertaining to the security incident. The vector of security incident features can optionally represent an incident's type, source, severity and/or other properties.

The vector of user features and the vector of security incident features can be supplied as inputs to the trained supervised machine learning model. The trained supervised machine learning model can be configured to process the inputs and to generate, based on the inputs, a prediction of the user's probable action(s) in response to the security incident.

The user-based response recommendation engine can generate a response recommendation for the user based on the prediction output from the trained supervised machine learning model. In some embodiments, the user-based response recommendation engine can then provide the response recommendation to the user, enabling the user to respond to the security incident more efficiently and effectively. In some other embodiments, the user-based response recommendation engine can include an automated response function that automatically performs actions recommended in the response recommendation. An automated response function can build automated responses comprising one or more actions encoded as sets of commands or rules.

Some example prediction outputs, and corresponding response recommendations, can comprise actions such as initiating a quarantine of a security threat, initiating a system recovery of a system comprising a security threat, blocking an internet protocol (IP) address associated with a security threat, and blocking a hostname associated with a security threat.

Some further example prediction outputs, and corresponding response recommendations, can comprise actions that may be specific to a particular security system, such as creating tickets used by the security system, applying a resource requirement via the security system, selecting security system tabs, buttons, or other controls, and/or holding a security incident for future processing.

Some further example prediction outputs, and corresponding response recommendations, can comprise detailed/specific actions, such as such as running one or more commands, e.g., Linux commands or otherwise, running or applying one or more short rules, running or applying one or more executable codes, or running or applying one or more actions from an incident response playbook.

Example prediction outputs, and corresponding response recommendations, can also comprise groups or sequences of the above example actions, e.g., a group of actions optionally performed in a particular order. In general, this disclosure is not limited to any particular prediction outputs. Instead, prediction outputs are a function of previous user actions in response to security incidents. As such, any action, group of actions, or sequence of actions can be predicted so long as it is based on the user's previous actions/responses.

Example features that can be included in user feature vectors, whether such vectors are used for training of a supervised machine learning model or subsequently as an input to a trained supervised machine learning model, include user features and organization features. Some example user features include user information such as a user's age, education, working experience, and/or location, as well as the user's historical action vector which can be computed e.g., as a bag-of-word model of actions included in the user's historical incident responses.

Example features that can be included in incident feature vectors, whether such vectors are used for training of a supervised machine learning model or subsequently as an input to a trained supervised machine learning model, include indications of a source of a security incident, optionally in the form of a binary vector including a one-hot representation of data. Another example feature that can be included in incident feature vectors is a description of the incident, optionally in the form of a binary vector including a one-hot representation of tokens in an incident's description field.

Some further example features, which can be included in user and/or incident feature vectors, are a total number of incidents to which a user has responded in a trailing time window, e.g., a one-week, one-month, or one-year trailing time window. Another example feature can comprise an indication of whether a user responded to an incident from a particular source, e.g., a same source as a current incident, within another trailing time window, e.g., a one-week, one-month, or one-year trailing time window. Another example feature can comprise an indication of whether a user responded to an incident having a same title as a current incident, within another trailing time window, e.g., a one-week, one-month, or one-year trailing time window.

Techniques for inference of user roles based on behavioral clustering are also disclosed herein and can be used to supplement the disclosed techniques for generating user-based threat response recommendations. For example, a user's role can be inferred according to the techniques disclosed herein, and recommendations generated for certain users, e.g., for less experienced users, can be modified to avoid error loops in which previous user mistakes or incorrect actions are recommended for a user. The techniques for inference of user roles based on behavioral clustering can also optionally be used independently, e.g., to infer user roles for user training, or to organize teams, or any other purpose.

Techniques for inference of user roles based on behavioral clustering can be configured to infer user roles from user historical responses to security incidents. In one example operation, users can be clustered into groups according to their historical interactions with security incidents. In a subsequent example operation, common action pattens of users within each group can be identified, and the common action patterns can optionally be represented as user journey graphs. In a subsequent example operation, the user groups can be labeled according to their user journey graphs.

In order to cluster users into groups, each user's historical actions to respond to security incidents can be collected, and then each user can be represented as a user action probability vector, representing probabilities of different actions in connection with responding to incidents. The collected historical actions can comprise generic actions such as a quarantine, a system recovery, a block IP, and/or a block hostname. The collected historical actions can alternatively or additionally comprise platform specific actions such as creating tickets, requiring more resources, clicking/selected tabs for investigation, and/or holding for future processing. The collected historical actions can alternatively or additionally comprise actions represented by commands (e.g., Linux commands), short rules, executable codes, and/or actions in an incident response playbook.

User action probability vectors can optionally take the form below:

$$p_u = <p_{u1}, p_{u2}, p_{u3}, \ldots, p_{um}>$$

where u is the user, m is the total number of actions, and p{ui} is the probability of user u performing an action i for responding security incidents. Each value p{ui} can be computed using the below formula:

$$p_{uk} = \frac{\text{number of incidents for which user } u \text{ performed action } k}{\text{user } u \text{ total number of incidents}}$$

In a next example operation, user action probability vectors can be placed into a matrix U. An example matrix U is illustrated below.

$$U = \begin{pmatrix} u_1 \\ u_2 \\ \ldots \\ u_n \end{pmatrix} = \begin{pmatrix} p_{11} & p_{12} & \ldots & p_{1m} \\ p_{21} & p_{22} & \ldots & p_{2m} \\ \ldots & \ldots & \ldots & \ldots \\ p_{n1} & p_{n2} & \ldots & p_{nm} \end{pmatrix}$$

In the above matrix U, n is the total number of users, each row is a user action probability vector associated with a different user u, and m is a total number of actions.

In a next example operation, users can be clustered, common action patterns can be identified for each cluster, and the common action patterns can optionally be visualized as user journey graphs. In an example clustering approach, a K-means++ clustering technique can be applied to assign similar rows in the matrix U into user clusters/groups.

A total number of groups can be determined using an Elbow Curve method. For example, the K-means++ clustering technique can be applied multiple times, each time with a different number of target output groups. The number of target output groups can start for example at two, and then increase by one in each round. The number of groups at which the within-cluster distance begins to flatten can be selected as the desired number of target output groups.

Once the users are clustered into the desired number of target output groups, common action patterns can be identified within each cluster. For example, a common action pattern of all users within a same cluster can be extracted as a user journey graph, by fitting a Markov chain model. An example user journey graph can comprise a tree or other flow that includes probabilities of a user progressing from one action to a next action.

After the common action patterns are identified, different user groups/clusters can be labeled. The user journey graphs can optionally be used in connection with labeling. In some embodiments, clusters can be labeled by a skilled/experienced user or security analyst. Example labels can include, e.g., "level 1 responders" and "level 2 responders" or "new responders" and "experienced responders."

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example network architecture including security system(s) 120 adapted to generate and employ customized security response recommendations, in accordance with various aspects of the technologies disclosed herein. FIG. 1 includes a network 100 that is subject to ongoing security threats 160. The network 100 can comprise any number of endpoints 110, including example endpoints 111, 112, 113, 114, 115, . . . , E. One or more of the endpoints 110 can experience security incidents 170 as a result of the security threats 160. The network 100 can further comprise security system(s) 120, incident data 131, and user response data 132.

The security system(s) 120 can include, inter alia, user role inference 121 and user-based response recommendation engine 122. Users 141, 142, 143 can comprise for example security analysts tasked with interacting with the security system(s) 120. The users 141, 142, 143 can generally perform response actions, including response actions 124A within the security system(s) 120 as well as response actions 124B affecting or reconfiguring the endpoints 110. The response actions 124A, 124B can be performed pursuant to response recommendations generated by the user-based response recommendation engine 122 described herein.

In an example according to FIG. 1, multiple different security threats 160 can result in multiple different security incidents 170 over time. Each time a security incident occurs, incident data 151 such as a title, description, severity, affected endpoint(s) 110, and other incident attributes can be gathered by the security system(s) 120 and stored within incident data 131, wherein incident data 131 can comprise a database, data store, or other storage. The incident data 131 can therefore comprise a catalog of historical security incidents along with security incident properties.

Furthermore, as the users 141, 142, 143 interact with the security system(s) 120 to respond to the incidents 170, the response actions of the various users 141, 142, 143 can be logged by the security system(s) 120 as user response data 132. For example, user actions such as selecting certain tabs or tools provided by the security system(s) 120, or quarantining certain endpoint(s) 110, or blocking IP addresses used within the network 100, can be stored as user response data 132. The user response data 132 can be associated with the user (of users 141, 142, 143) who took the response actions, and can also be associated with or include incident attributes of the incident (identified in incident data 131) which triggered the user response.

Initially, the user response data 132 can optionally be used by user role inference 121 to cluster the users 141, 142, 143 into different groups or clusters. User role inference 121 can also label the resulting clusters or users within each cluster, e.g., by applying user role labels that identified users according to their experience/skill levels in responding to incidents 170.

Furthermore, initially the user-based response recommendation engine 122 can be trained, using at least a portion of the user response data 132 and the incident data 131, so that the user-based response recommendation engine 122 learns to identify probable user response actions based on input data comprising security incident data (e.g., associated with one of the security incidents in the incident data 131), and historical user response data (e.g., associated with one of the users 141, 142, or 143 identified in the user response data 132).

After the initial operations of user role inference 121 and the training of the user-based response recommendation engine 122, the trained user-based response recommendation engine 122 can be deployed and used within the security system(s) 120. Upon occurrence of a current security incident of security incidents 170, the security system(s) 120 can collect incident data 151 for the current security incident. The security system(s) 120 can furthermore identify a user, e.g., user 141, who is tasked with responding to the current incident. The security system(s) 120 can then collect applicable user response data associated with the identified user 141 from the user response data 132.

The security system(s) 120 can provide the incident data 151 for the current security incident, as well as applicable user response data associated with the identified user 141, as inputs to the user-based response recommendation engine 122. The user-based response recommendation engine 122 can process the supplied inputs and generate response recommendations for the identified user 141. The response recommendations can comprise predicted actions that the identified user 141 would probably take in response to the current security incident. The identified user 141 can then choose to follow the response recommendations when performing response actions 124A and/or 124B.

In some embodiments, the security system(s) 120 can furthermore be configured to apply user role information associated with the identified user 141. For example, when the identified user 141 is labeled as an experienced user, the security system(s) 120 can generate response recommendations as described above, namely, by supplying applicable user response data associated with the identified user 141 as one of the inputs to the user-based response recommendation engine 122. However, when the identified user 141 is labeled as an inexperienced user, the security system(s) 120 can generate response recommendations by instead supplying applicable user response data associated with a different, experienced user, e.g., user 142, as one of the inputs to the user-based response recommendation engine 122. Alternatively, the security system(s) 120 can otherwise implement a check or further processing, to ensure that inexperienced users benefit from effective response recommendations.

Figure 2:
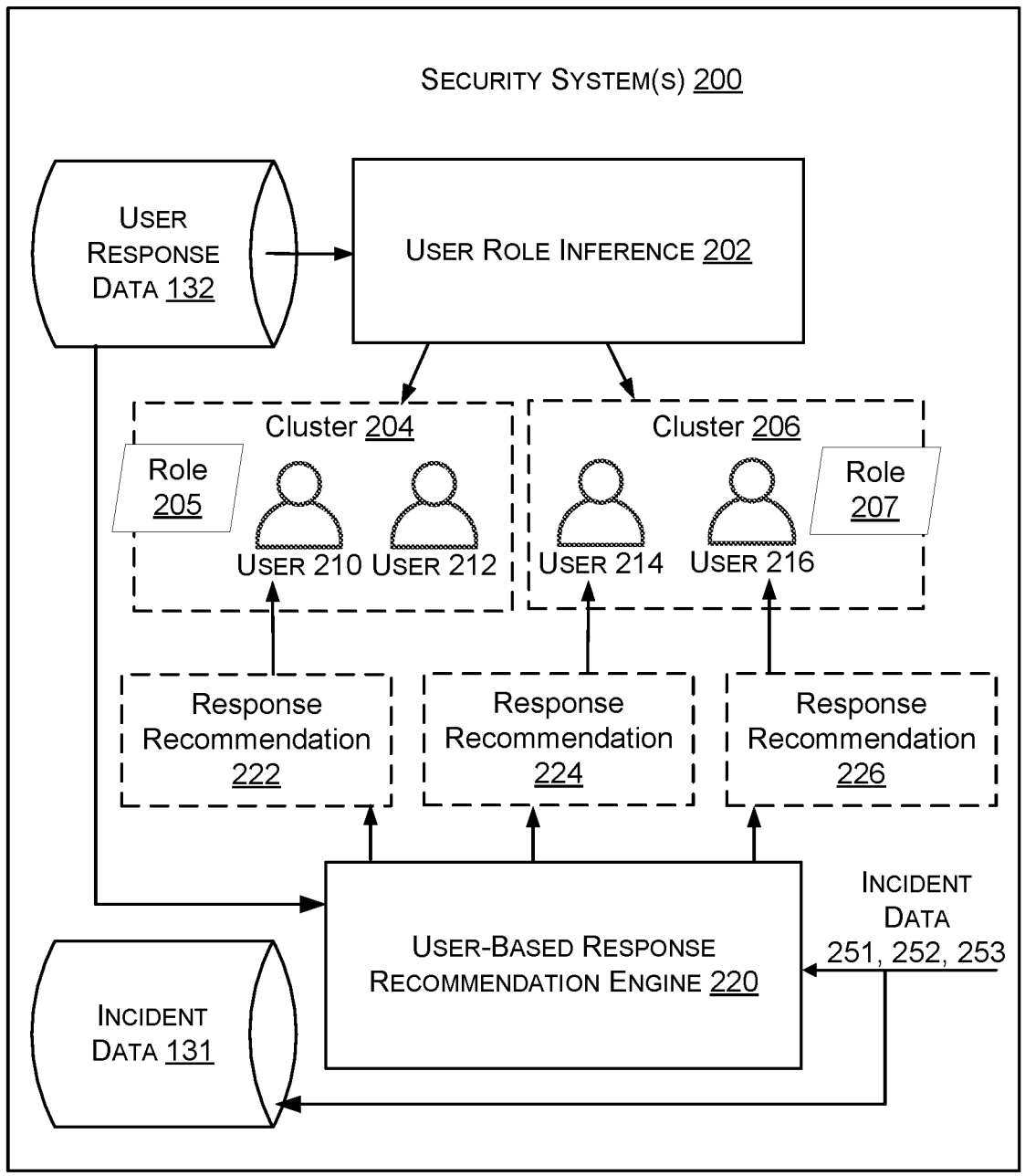
FIG. 2 illustrates example security system(s) which may implement the security system(s) introduced in FIG. 1, in accordance with various aspects of the technologies disclosed herein.

FIG. 2 illustrates example security system(s) 200 which may implement the security system(s) 120 introduced in FIG. 1, in accordance with various aspects of the technologies disclosed herein. The example security system(s) 200 include user role inference 202 and user-based response recommendation engine 220, which can implement the user role inference 121 and the user-based response recommendation engine 122, respectively.

In an example according to FIG. 2, the user role inference 202 can process user response data 132, introduced in FIG. 1, to generate user clusters 204, 206. Each cluster can comprise a group of users, e.g., cluster 204 includes users 210 and 212, and cluster 206 includes users 214 and 216. Furthermore, each cluster can optionally be labeled according to a user role, e.g., role 205 or role 207, identified for a cluster. The roles 205, 207 can optionally comprise a user experience level of the users in a cluster.

Furthermore, the user-based response recommendation engine 220 can process incident data 251, 252, 253 arising from three example current incidents, as well as applicable user data obtained from user response data 132, introduced in FIG. 1. The incident data 251, 252, 253 can also be stored along with other incident data 131, introduced in FIG. 1.

In an example, the security system(s) 200 can identify user 216 as the security analyst to respond to the incident associated with the incident data 251, and so the applicable user data for incident data 251 can comprise the user data for user 216. Similarly, the applicable user data for incident data 252 can comprise the user data for user 214, and the applicable user data for incident data 253 can comprise the user data for user 210.

The user-based response recommendation engine 220 can therefore be deployed into the security system(s) 200 and used by the security system(s) to process incident data 251 as well as user data for user 216 as inputs; and can output response recommendation 226 for user 216's response to incident data 251. Similarly, the user-based response recommendation engine 220 can process incident data 252 as well as user data for user 214 as inputs and can output response recommendation 224 for user 214's response to incident data 252. The user-based response recommendation engine 220 can process incident data 253 as well as user data for user 210 as inputs and can output response recommendation 222 for user 210's response to incident data 253.

The security system(s) 200 can also optionally be configured to include clusters 204, 206 and roles 205, 207 in the generation of the response recommendations 222, 224, 226. For example, consider a scenario where role 205 is an inexperienced or new user role, and role 207 is an experienced or advanced user role. Security system(s) 200 can optionally be configured to identify the role 205 applicable to user 210, and, in view of the role 205 being an inexperienced user, the security system(s) can be configured to use another user's data, e.g., the user data for user 214, in connection with generating the response recommendation 222. Therefore, the user-based response recommendation engine 220 can process incident data 253 as well as user data for user 214 as inputs and can output response recommendation 222 for user 210's response to incident data 253.

Figure 3:
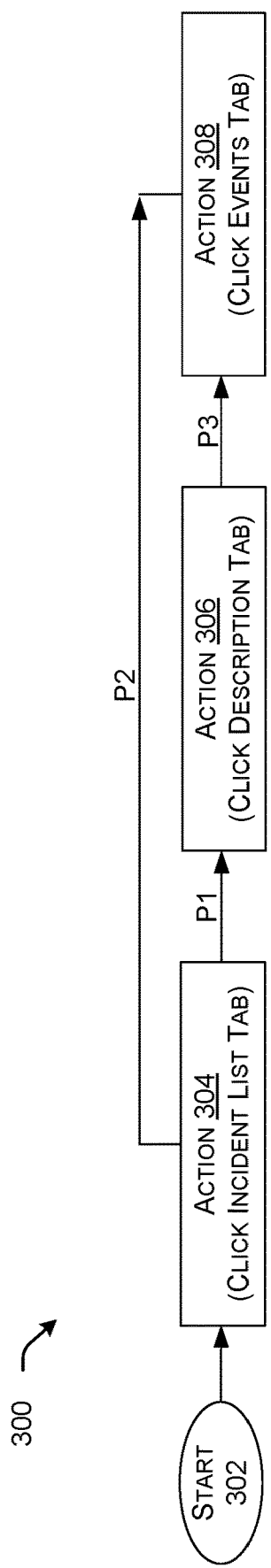
FIG. 3 illustrates an example user journey graph that can be generated by a user role inference component such as the user role inference component introduced in FIG. 2, in accordance with various aspects of the technologies disclosed herein.

FIG. 3 illustrates an example user journey graph 300 that can be generated by a user role inference component such as the user role inference 202 introduced in FIG. 2, in accordance with various aspects of the technologies disclosed herein. The user journey graph 300 includes a start 302, an example first action 304, an example second action 306, and an example third action 308. The example first action 304 can comprise, e.g., user's a click on an incident list tab provided by a security system. The example second action 306 can comprise, e.g., user's a click on a description tab provided by the security system. The example third action 308 can comprise, e.g., user's a click on an events tab provided by the security system.

The actions 304, 306, and 308 are connected by probability values, such as probability 1 (P1), probability 2 (P2), and probability 3 (P3). The probability values represent probabilities, based on the user's historic incident response behavior, that the user will move from one action to the next. Thus, for example, P1 may have an example value of 0.8, indicating an 80% likelihood that the user will go from action 304 to action 306. P2 may have an example value of 0.2, indicating a 20% likelihood that the user will go from action 304 to action 308. P3 may have an example value of 1.0, indicating a 100% likelihood that the user will go from action 306 to action 308.

The example actions 304, 306, and 308 described herein, and the probabilities P1, P2, and P3 are examples only and a given user journey graph 300 can include any action types, any number of actions, and any probabilities. The user role inference 202 can be configured to identify, based on the historical user response data such as the user response data 132, common action patterns associated with a user, a group of two or more users, or multiple users, and user role inference 202 can generate user journey graphs such as user journey graph 300 to represent the identified common action patterns.

Figure 4:
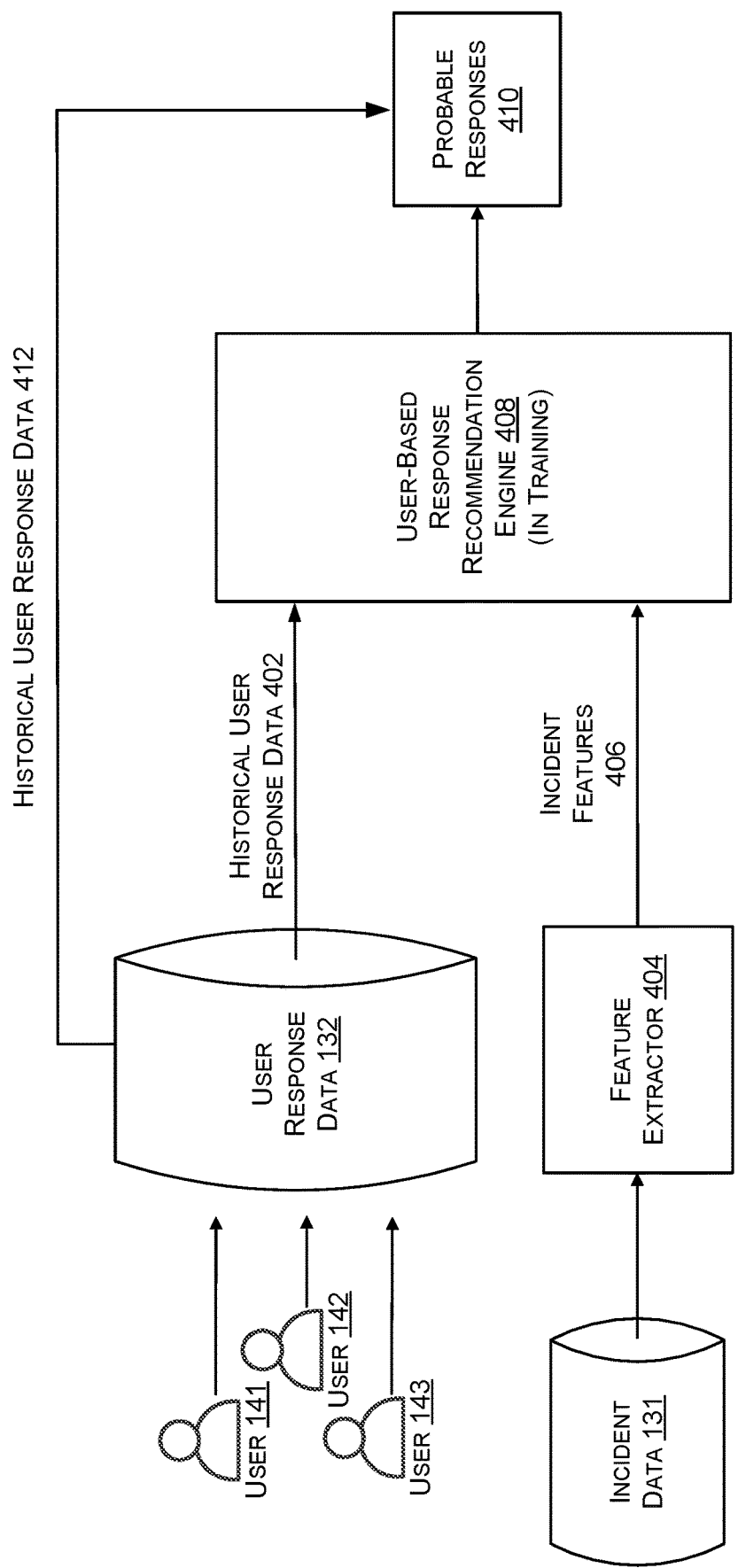
FIG. 4 illustrates example operations of a user-based response recommendation engine in a training stage and in accordance with various aspects of the technologies disclosed herein.

FIG. 4 illustrates example operations of a user-based response recommendation engine 408 in a training stage and in accordance with various aspects of the technologies disclosed herein. FIG. 4 includes the user-based response recommendation engine 408 (in training), the user response data 132 and the incident data 131 introduced in FIG. 1, the users 141, 142, 143 introduced in FIG. 1, a feature extractor 404, and probable responses 410.

In an example according to FIG. 4, as security incidents occur in a network, security incident data can be stored in incident data 131, as described with reference to FIG. 1. Furthermore, as the users 141, 142, 143 take actions in response to the security incidents, the user's 141, 142, 143 responsive actions can be stored as user response data 132, as also described with reference to FIG. 1. In general, the incident data 131 and the user response data 132 can be used to train the user-based response recommendation engine 408, so that the user-based response recommendation engine 408 becomes trained to accurately output probable responses 410 which predict the probable responses of different users in response to security incidents.

A portion of the user response data 132, identified as historical user response data 402, can be provided to the user-based response recommendation engine 408 for training. The historical user response data 402 can optionally be pre-processed in order to generate a different historical user response feature vector for each different user, and the historical user response feature vectors can be provided as training inputs to the user-based response recommendation engine 408.

The feature extractor 404 can be configured to extract incident features 406 from different security incidents stored in the incident data 131. The extracted incident features 406 can optionally be pre-processed in order to generate different incident feature vectors for each security incident, and the incident feature vectors can be provided as training inputs to the user-based response recommendation engine 408.

In order to train the user-based response recommendation engine 408, pairs of inputs can be supplied to the user-based response recommendation engine 408, and the user-based response recommendation engine 408 can be instructed to generate probable responses 410. The user-based response recommendation engine 408 can be rewarded for generating probable responses that more closely match known actual responses of the users to the security incidents. The pairs of inputs can each comprise an historical user response feature vector and an incident feature vector.

Another portion of the user response data 132, identified as historical user response data 412, can optionally be used to test the accuracy of the probable responses 410. For example, the historical user response data 412 can comprise a known actual response of a given user to a given security incident. The incident feature vector and that user's historical user response feature vector can be provided as inputs to the user-based response recommendation engine 408, and the resulting output can be compared to the historical user response data 412.

Figure 5:
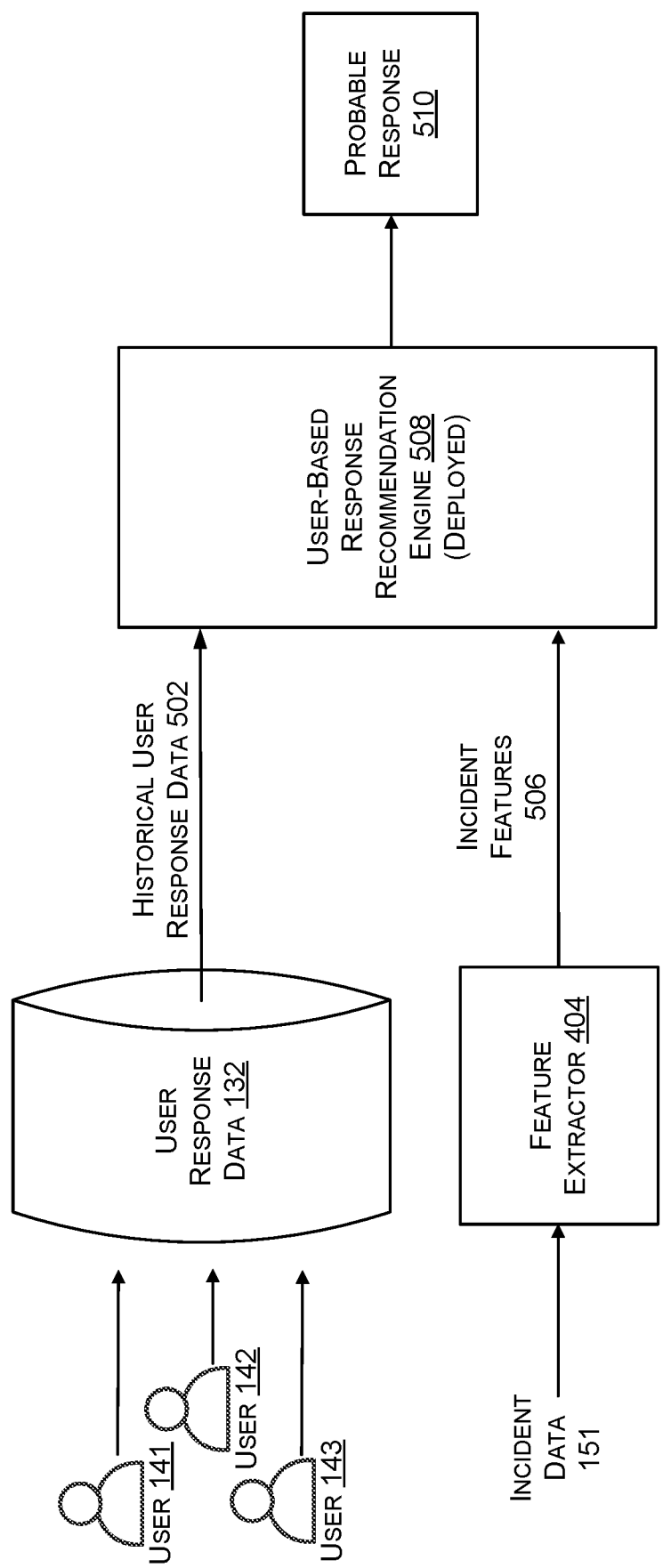
FIG. 5 illustrates example operations of a user-based response recommendation engine in a deployed stage and in accordance with various aspects of the technologies disclosed herein.

FIG. 5 illustrates example operations of a user-based response recommendation engine 508 in a deployed stage and in accordance with various aspects of the technologies disclosed herein. The user-based response recommendation engine 508 (deployed) can be generated by training the user-based response recommendation engine 408 (in training) described with reference to FIG. 4, and the user-based response recommendation engine 508 (deployed) can optionally provide the user-based response recommendation engine 220 or the user-based response recommendation engine 122 in some embodiments. FIG. 5 includes the user-based response recommendation engine 508 (deployed), the user response data 132 and the incident data 151 introduced in FIG. 1, the users 141, 142, 143 introduced in FIG. 1, the feature extractor 404 introduced in FIG. 4, and a probable response 510.

In an example according to FIG. 5, a new security incident has occurred in the network, and incident data 151 has been obtained therefrom, as described with reference to FIG. 1. The user response data 132 includes indications of previous actions taken by the users 141, 142, 143 in response to security incidents, as also described with reference to FIG. 1.

The incident data 151 can be processed by the feature extractor 404. The feature extractor 404 can extract incident features 506 from the incident data 151. The extracted incident features 506 can optionally be pre-processed in order to generate an incident feature vector for the security incident represented by incident data 151, and the incident feature vector can be provided as an input to the user-based response recommendation engine 508.

The user tasked with responding to the security incident represented by incident data 151, e.g., the user 141, can be identified. The historical user response data 502 can then be obtained from the user response data 132, wherein the historical user response data 502 comprises user features associated with the user 141. The historical user response data 502 can optionally be pre-processed in order to generate an historical user response feature vector for the user 141, and the historical user response feature vector can be provided as an input to the user-based response recommendation engine 508, along with the incident features 506.

The user-based response recommendation engine 508 can be instructed to generate the probable response 510 based on the historical user response data 502 and the incident features 506. The probable response 510 can comprise, e.g., a more or most probable response by the user 141 to the incident represented by the incident data 151. The probable response 510 can be included as a response recommendation provided to the user 141, which recommends actions for the user 141 to take to respond to the incident represented by the incident data 151.

Figure 6:
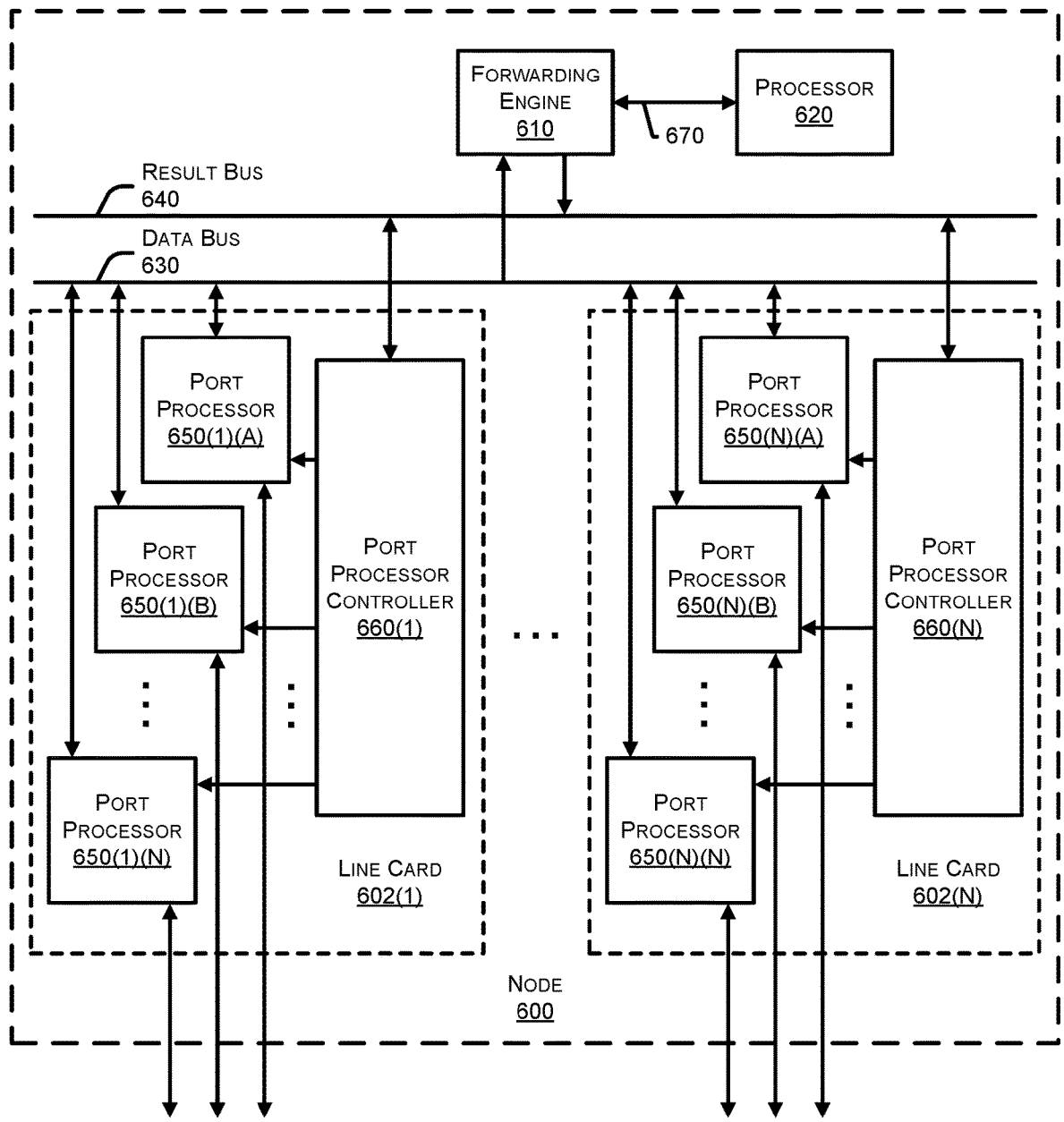
FIG. 6 illustrates an example node that can be utilized to implement an endpoint in a network, in accordance with various aspects of the technologies disclosed herein.

FIG. 6 illustrates an example node that can be utilized to implement an endpoint device in a network, in accordance with various aspects of the technologies disclosed herein. In some examples, node 600 may include any number of line cards 602, e.g., line cards 602(1)-(N), where N may be any integer greater than 1, and wherein the line cards 602 are communicatively coupled to a forwarding engine 610 (also referred to as a packet forwarder) and/or a processor 620 via a data bus 630 and/or a result bus 640.

Line cards 602 may include any number of port processors 650, for example, line card 602(1) comprises port processors 650(1)(A)-650(1)(N), and line card 602(N) comprises port processors 650(N)(A)-650(N)(N). The port processors 650 can be controlled by port processor controllers 660, e.g., port processor controllers 660(1), 660(N), respectively.

Additionally, or alternatively, the forwarding engine 610 and/or the processor 620 can be coupled to one another via the data bus 630 and the result bus 640 and may also be communicatively coupled to one another by a communications link 670. The processors (e.g., the port processor(s) 650 and/or the port processor controller(s) 660) of each line card 602 may optionally be mounted on a single printed circuit board.

When a packet or packet and header are received, the packet or packet and header may be identified and analyzed by the node 600 in the following manner. Upon receipt, a packet (or some or all of its control information) or packet and header may be sent from one of port processor(s) 650 at which the packet or packet and header was received and to one or more of those devices coupled to the data bus 630 (e.g., others of the port processor(s) 650, the forwarding engine 610 and/or the processor 620). Handling of the packet or packet and header may be determined, for example, by the forwarding engine 610.

For example, the forwarding engine 610 may determine that the packet or packet and header should be forwarded to one or more of the other port processors 650. This may be accomplished by indicating to corresponding one(s) of port processor controllers 660 that a copy of the packet or packet and header held in the given one(s) of port processor(s) 650 should be forwarded to the appropriate other one of port processor(s) 650. Additionally, or alternatively, once a packet or packet and header has been identified for processing, the forwarding engine 610, the processor 620, and/or the like may be used to process the packet or packet and header in some manner and/or may add packet security information in order to secure the packet.

On a node 600 sourcing a packet or packet and header, processing may include, for example, encryption of some or all of the packet or packet and header information, the addition of a digital signature, and/or some other information and/or processing capable of securing the packet or packet and header. On a node 600 receiving a packet or packet and header, the processing may be performed to recover or validate the packet or packet and header information that has been secured.

Figure 7:
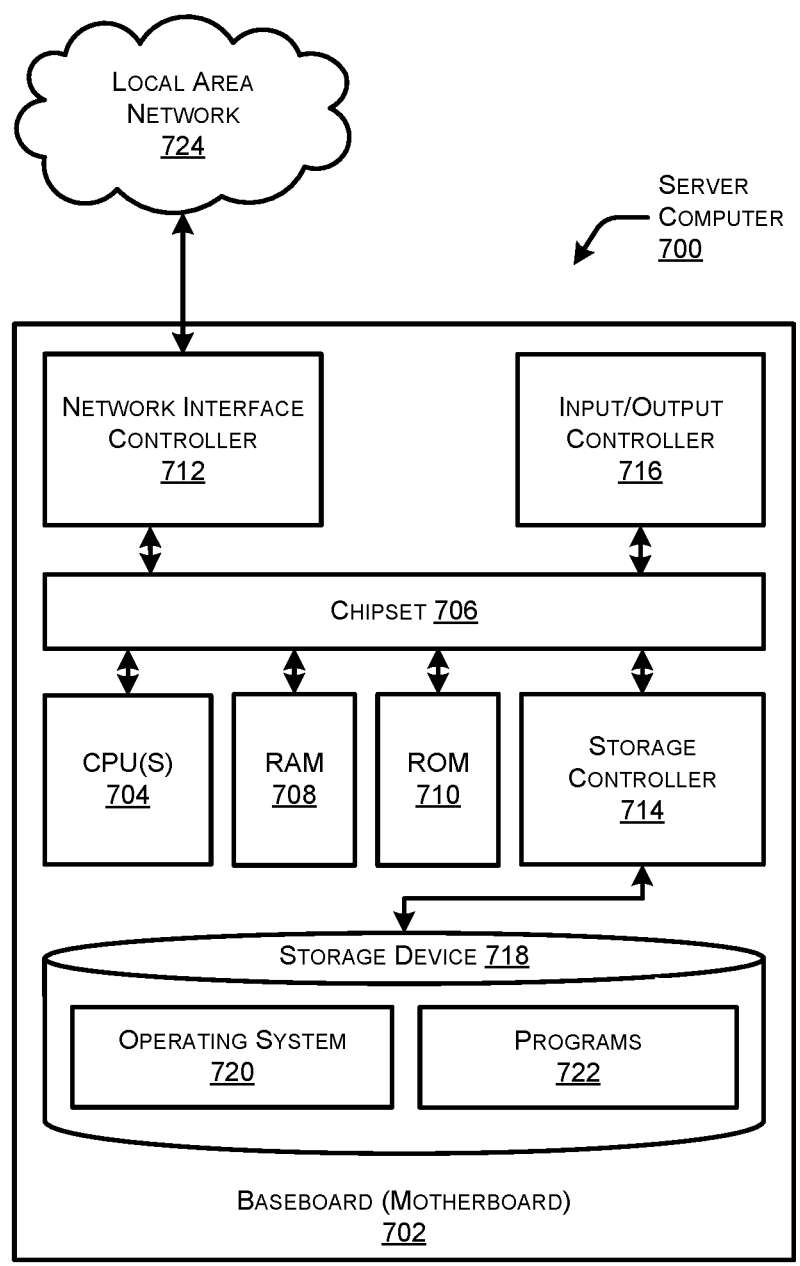
FIG. 7 illustrates an example computer hardware architecture that can implement the security system(s) disclosed herein, in accordance with various aspects of the technologies disclosed herein.

FIG. 7 illustrates an example computer hardware architecture that can implement the security system(s) disclosed herein, in accordance with various aspects of the technologies disclosed herein. The illustrated computer hardware architecture can also optionally implement any network endpoint. The computer architecture shown in FIG. 7 illustrates a conventional server computer 700, however the computer architecture can optionally implement any other computing devices such as a router, a workstation, desktop computer, laptop, tablet, network appliance, e-reader, smartphone, or other computing device. The illustrated computer architecture can be utilized to execute any of the software components presented herein.

The server computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the server computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the server computer 700. The chipset 706 can further provide an interface to a computer-readable storage medium such as a read-only memory ("ROM") 710 or non-volatile RAM ("NVRAM") for storing basic routines that help to start up the server computer 700 and to transfer information between the various components and devices. The ROM 710 or NVRAM can also store other software components necessary for the operation of the server computer 700 in accordance with the configurations described herein.

The server computer 700 can operate in a networked environment using logical connections to remote computing devices and computer systems through a network, such as the LAN 724. The chipset 706 can include functionality for providing network connectivity through a NIC 712, such as a gigabit Ethernet adapter. The NIC 712 is capable of connecting the server computer 700 to other computing devices over the LAN 724. It should be appreciated that multiple NICs 712 can be present in the server computer 700, connecting the computer to other types of networks and remote computer systems.

The server computer 700 can be connected to a storage device 718 that provides non-volatile storage for the server computer 700. The storage device 718 can store an operating system 720, programs 722, and data, to implement any of the various components described in detail herein.

The storage device 718 can be connected to the server computer 700 through a storage controller 714 connected to the chipset 706. The storage device 718 can comprise one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the server computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 700 can further read information from the storage device 718 by detecting the physical states or characteristics of one or more particular locations within the physical storage units.

In addition to the mass storage device 718 described above, the server computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 700. In some examples, the operations performed by the computing elements illustrated in FIGS. 1-5, and or any components included therein, may be supported by one or more devices similar to server computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the server computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the server computer 700.

In one embodiment, the storage device 718 or other computer-readable storage media is encoded with computer-executable instructions which, when loaded into the server computer 700, transform the computer from a general-purpose computing system into a special-purpose computer capable of implementing the embodiments described herein. These computer-executable instructions transform the server computer 700 by specifying how the CPUs 704 transition between states, as described above.

According to one embodiment, the server computer 700 has access to computer-readable storage media storing computer-executable instructions which, when executed by the server computer 700, can implement the architectures and perform the various processes described with regard to FIGS. 8-12. The server computer 700 can also include computer-readable storage media having instructions stored thereupon for performing any of the other computer-implemented operations described herein.

The server computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat panel display, a digital projector, a printer, or other type of output device. It will be appreciated that the server computer 700 might not include all of the components shown in FIG. 7, can include other components that are not explicitly shown in FIG. 7, or might utilize an architecture completely different than that shown in FIG. 7.

Figure 8:
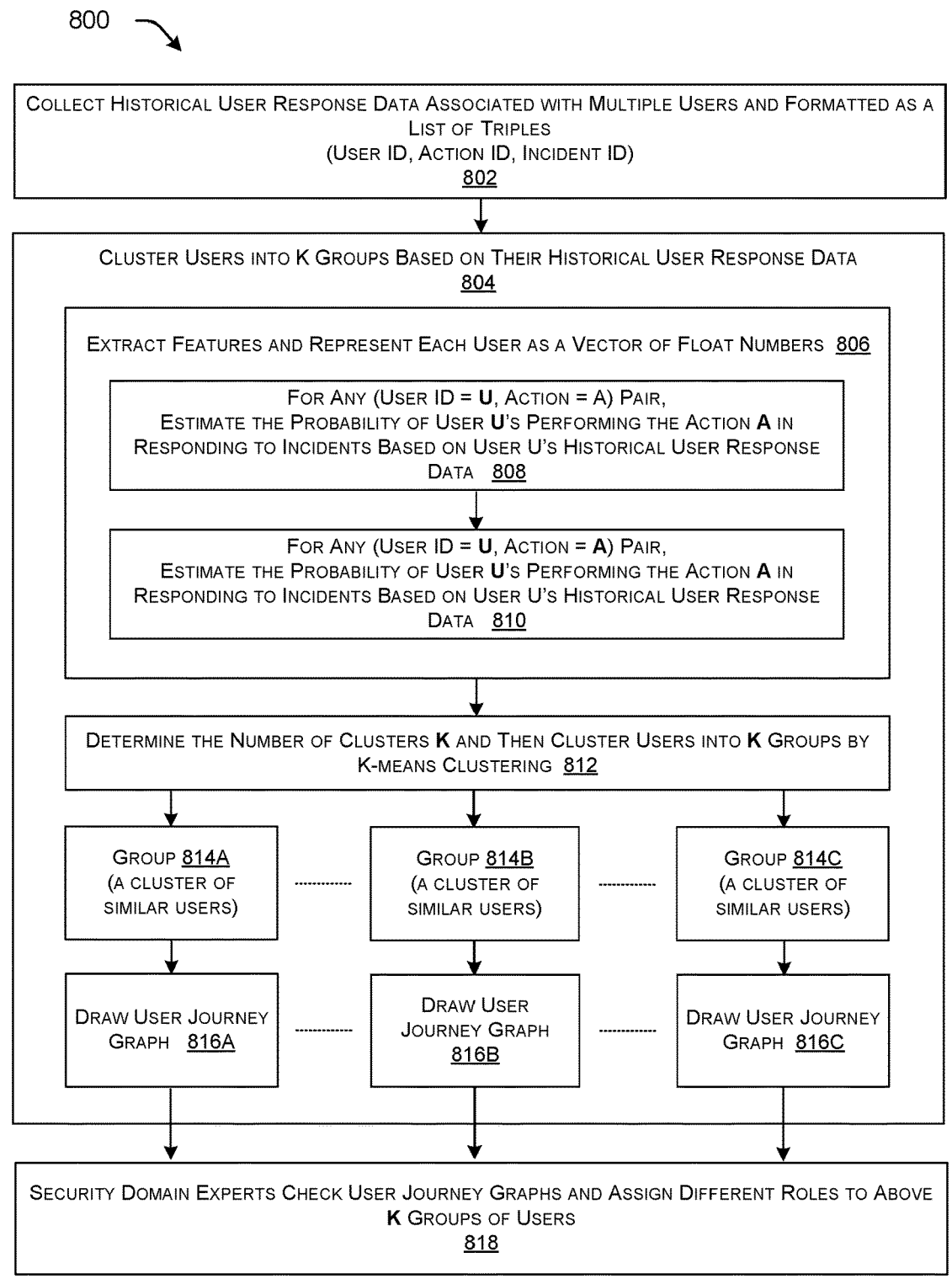
FIG. 8 illustrates an example user role inference architecture, in accordance with various aspects of the technologies disclosed herein.

FIG. 8 illustrates an example user role inference architecture 800, in accordance with various aspects of the technologies disclosed herein. The illustrated architecture 800 can be implemented by a computing device, such as the server computer 700. The logical operations described herein with respect to FIG. 8 may be implemented (1) as a sequence of computer-implemented acts or program modules running on a computing system and/or (2) as interconnected machine logic circuits or circuit modules within the computing system. In some examples, the architecture 800 may be performed by a system comprising one or more processors and one or more non-transitory computer-readable media storing computer-executable instructions that, when executed by the one or more processors, cause the one or more processors to perform operations of the illustrated components.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

The example architecture 800 includes, "collect historical user response data associated with multiple users and formatted as a list of triples (user id, action id, incident id)" at module 802, followed by "cluster users into k groups based on their historical user response data" at module 804, followed by "security domain experts check user journey graphs and assign different roles to above K groups of users" at module 818.

Module 804 includes, "extract features and represent each user as a vector of float numbers" at module 806, followed by "determine the number of clusters K and then cluster users into k groups by k-means clustering" at module 812. Module 812 can output groups, such as group 814A, group 814B, and group 814C, wherein each group can comprise a cluster of similar users. The architecture 800 can draw user journey graphs based on each group's historical user response data, e.g., draw user journey graph 816A, draw user journey graph 816B, and draw user journey graph 816C. The resulting user journey graphs can be provided to module 818.

Module 806 includes, "for any (user ID=U, action=A) pair, estimate the probability of user U's performing the action A in responding to incidents based on user U's historical user response data" at module 808, and, "for any (user ID=U, action=A) pair, estimate the probability of user U's performing the action A in responding to incidents based on user U's historical user response data," at module 810.

Figure 9:
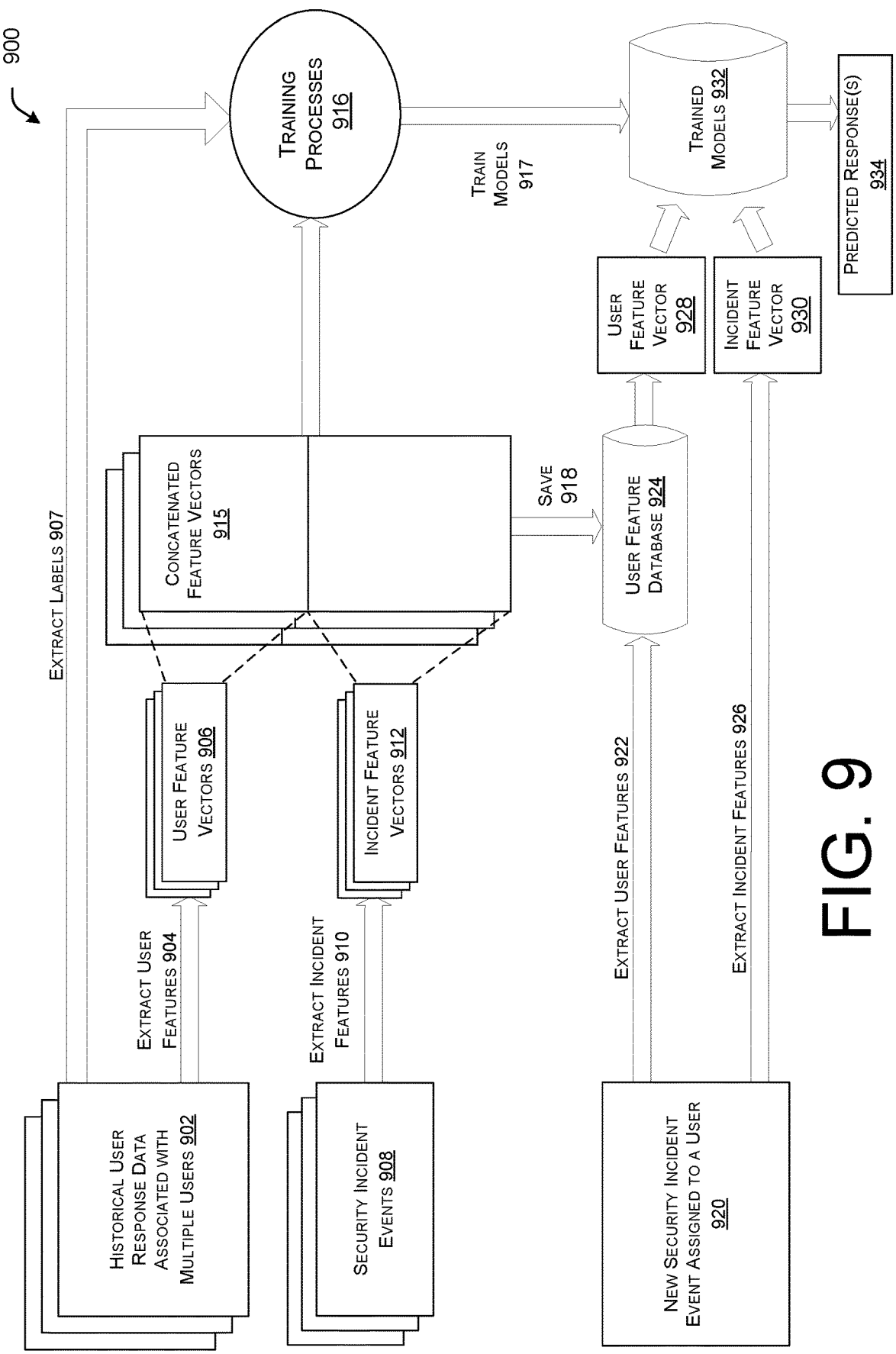
FIG. 9 illustrates an example user-based response recommendation architecture, in accordance with various aspects of the technologies disclosed herein.

FIG. 9 illustrates an example user-based response recommendation architecture 900, in accordance with various aspects of the technologies disclosed herein. The illustrated architecture 900 can be implemented by a computing device, such as the server computer 700. The logical operations described herein with respect to FIG. 9 may be implemented (1) as a sequence of computer-implemented acts or program modules running on a computing system and/or (2) as interconnected machine logic circuits or circuit modules within the computing system. In some examples, the architecture 900 may be performed by a system comprising one or more processors and one or more non-transitory computer-readable media storing computer-executable instructions that, when executed by the one or more processors, cause the one or more processors to perform operations of the illustrated components.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

The example architecture 900 includes training modules and operations configured to train the trained model(s) 932, as well as deployed modules and operations which make use of the trained model(s) 932 to generate predicted response(s) 934. During a training stage, historical user response data associated with multiple users 902 can be processed to extract user features 904, resulting in user feature vectors 906. Security incident events 908 can also be processed to extract incident features 910, resulting in incident feature vectors 912. The user feature vectors 906 and the incident feature vectors 912 can be combined into concatenated feature vectors 915. The concatenated feature vectors 915 can be used by training processes 916 to train models 917, resulting in trained models 932.

Furthermore, during the training stage, the historical user response data associated with multiple users 902 can be processed to extract labels 907 representing user actions in response to incidents. The extracted labels 907 can be provided to the training processes 916 for use in connection with operations to train models 917. The concatenated feature vectors 915 can be saved 918 in a user feature database 924.

After the training stage, the trained models 932 can be used to assist in responding to security incidents. An example new security incident event assigned to a user 920 can be processed to extract user features 922 from the user feature database 924, resulting in a user feature vector 928. The new security incident event assigned to a user 920 can furthermore be processed to extract incident features 926 from the new security incident event, resulting in an incident feature vector 930. The user feature vector 928 and the incident feature vector 930 can be provided as inputs to the trained models 932, and the trained models 932 can generate, based on the inputs, an output comprising predicted response(s) 934 of the user to the new security incident event.

Figure 10:
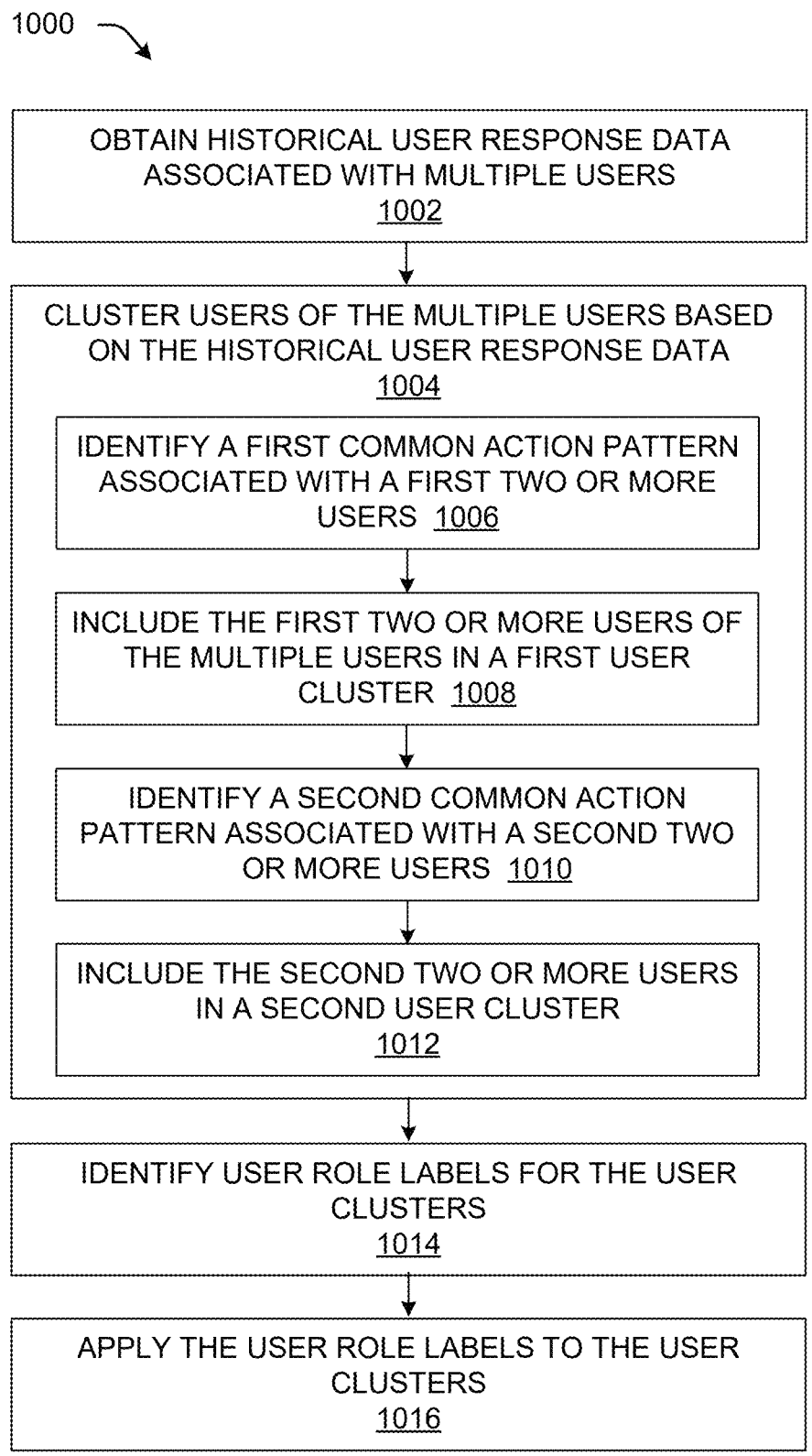
FIG. 10 is a flow diagram that illustrates an example method performed in connection with user role inference, in accordance with various aspects of the technologies disclosed herein.
Figure 11:
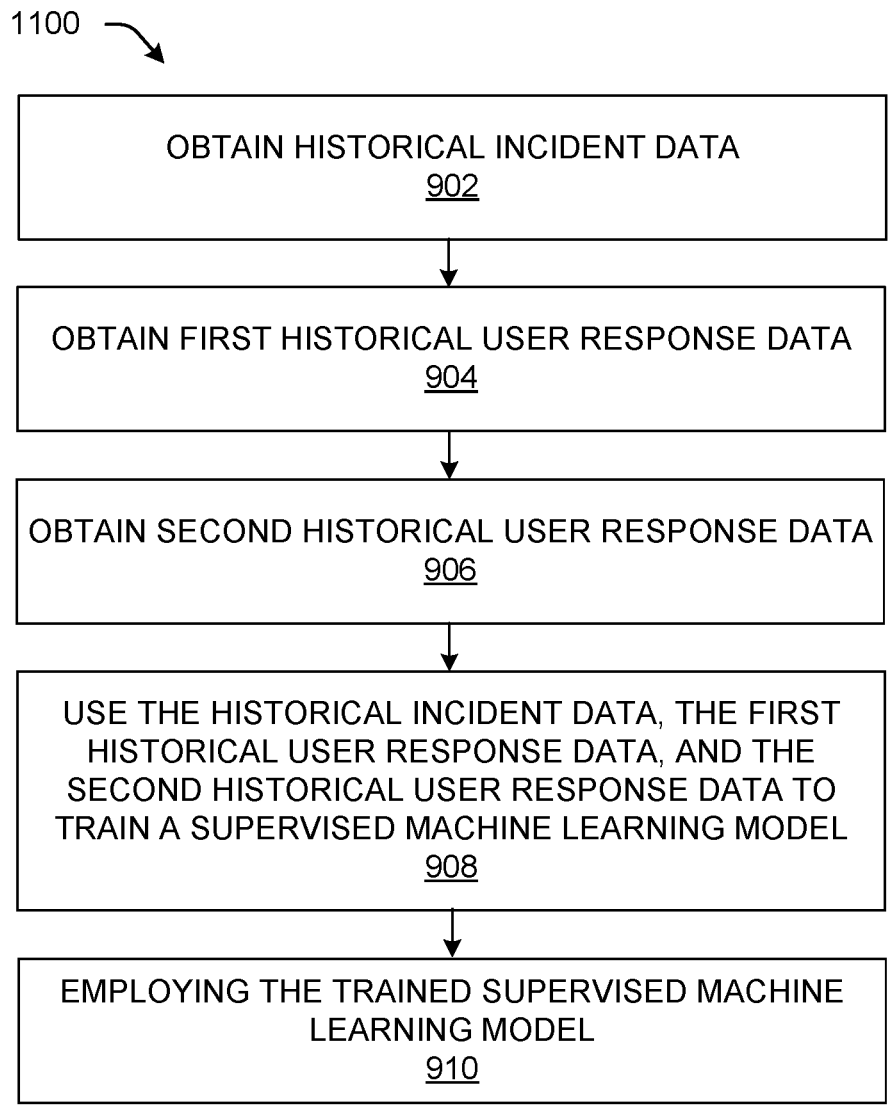
FIG. 11 is a flow diagram that illustrates an example method performed in connection with training of a user-based response recommendation engine, in accordance with various aspects of the technologies disclosed herein.
Figure 12:
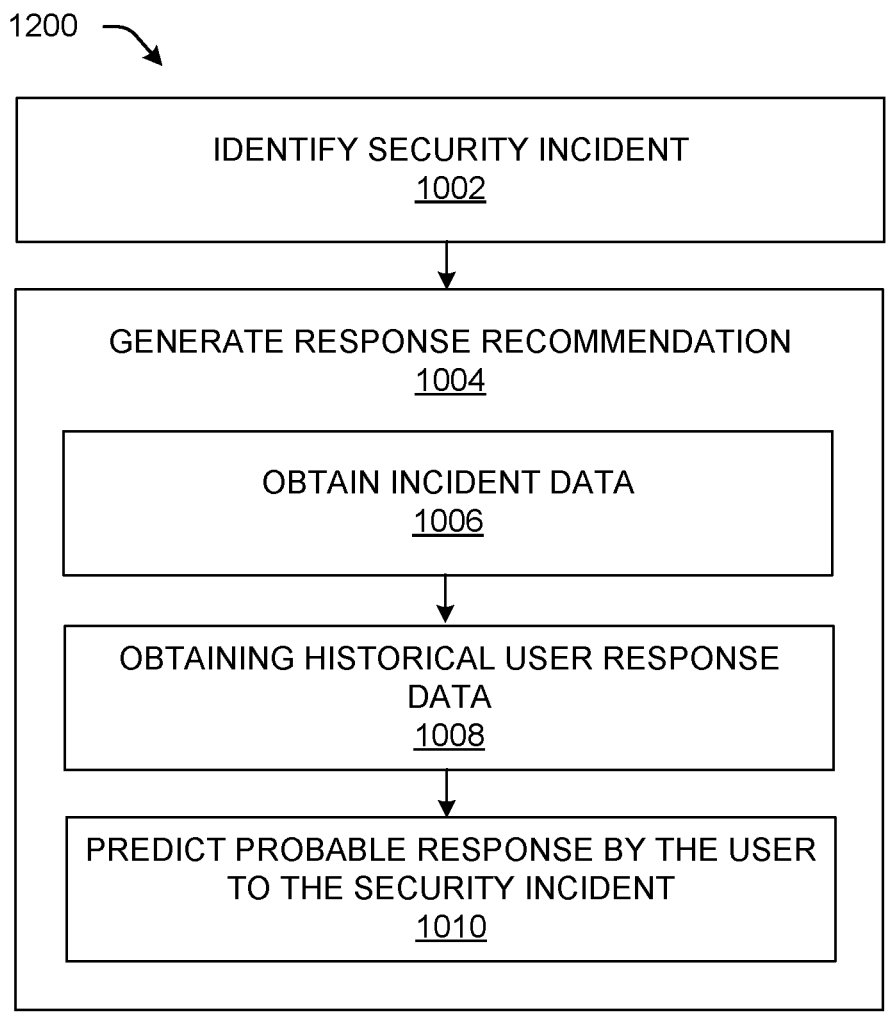
FIG. 12 is a flow diagram that illustrates an example method performed in connection the use of a deployed a user-based response recommendation engine, in accordance with various aspects of the technologies disclosed herein.

FIGS. 10, 11, and 12 are flow diagrams of example methods 1000, 1100, 1200 performed at least partly by a computing device, such as the server computer 700. The logical operations described herein with respect to FIGS. 10, 11, and 12 may be implemented (1) as a sequence of computer-implemented acts or program modules running on a computing system and/or (2) as interconnected machine logic circuits or circuit modules within the computing system. In some examples, the methods 1000, 1100, 1200 may be performed by a system comprising one or more processors and one or more non-transitory computer-readable media storing computer-executable instructions that, when executed by the one or more processors, cause the one or more processors to perform the methods 1000, 1100, 1200.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

It should also be appreciated that more or fewer operations might be performed than shown in FIGS. 10, 11, and 12 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by fewer components, more components, different components, or any configuration of components.

FIG. 10 is a flow diagram that illustrates an example method performed in connection with user role inference, in accordance with various aspects of the technologies disclosed herein. In an example embodiment, the illustrated method can be performed at a server computer 700 comprising security system(s) 200 such as illustrated in FIG. 2. At operation 1002, the user role inference 202 can obtain historical user response data, e.g., from the user response data 132, associated with multiple users 210, 212, 214, 216. The historical user response data can comprise indications of previous responses by the multiple users 210, 212, 214, 216 to previous security incidents.

In some embodiments, the historical user response data obtained at operation 1002 can comprise data indicative of user actions such as quarantine actions, system recovery actions, IP address blocking actions, and/or hostname blocking actions. Alternatively, or additionally, the historical user response data can comprise data indicative of user actions such as a ticket creation action, a resource requirement action, a tab click action, and/or a hold for future processing action.

At operation 1004, the user role inference 202 can cluster users of the multiple users 210, 212, 214, 216 based on the historical user response data, resulting in two or more different user clusters, e.g., the cluster 204 and the cluster 206. The clustering at operation 1004 can comprise the operations 1006, 1008, 1010, and 1012.

At operation 1006, the user role inference 202 can identify, based on the historical user response data, a first common action pattern exhibited in historical user response data associated with a first two or more users of the multiple users 210, 212, 214, 216, e.g., the users 210 and 212. At operation 1008, the user role inference 202 can include the first two or more users 210, 212 of the multiple users 210, 212, 214, 216 in a first user cluster 204 of the two or more different user clusters 204, 206.

At operation 1010, the user role inference 202 can identify, based on the historical user response data, a second common action pattern exhibited in historical user response data associated with a second two or more users of the multiple users 210, 212, 214, 216, e.g., the users 214 and 216. At operation 1012, the user role inference 202 can include the second two or more users 214 and 216 of the multiple users 210, 212, 214, 216 in a second user cluster 206 of the two or more different user clusters 204, 206.

In some embodiments, operations 1006, 1008, 1010, and 1012 can comprise representing respective users of the multiple users 210, 212, 214, 216 as respective probability vectors, each respective probability vector comprising respective probabilities that a respective user will perform a respective action in response to a respective security incident of the previous security incidents. A clustering technique, e.g., k-means clustering or otherwise, can then be applied to cluster the respective probability vectors, resulting in the user clusters, and common action patterns can be identified based on the aggregate probability vectors in a given user cluster. User journey graphs, e.g., a first and second user journey graph, can then optionally be generated based on the first and second common action patterns.

Subsequent to clustering the multiple users 210, 212, 214, 216 into clusters 204, 206, at operation 1014 the user role inference 202 can identify, based on the common action patterns, user role labels, e.g., roles 205, 207 for the user clusters 204, 206. More particularly, the user role inference 202 can identify, based on the first common action pattern, a first user role label, e.g., role 205 for the first user cluster 204, and the user role inference 202 can identify, based on the second common action pattern, a second user role label, e.g., role 207 for the second user cluster 206. The first user role 205 can identify for example a less experienced user role, and the second user role 207 can identify for example a more experienced user role. At operation 1016, the user role inference 202 can apply the user role labels, e.g., roles 205, 207 to the user clusters 204, 206, e.g., by applying the label of the first user role 205 to the first user cluster 204 and applying the label of the second user role 207 to the second user cluster 206.

Once generated, the labeled first user cluster 204 and second user cluster 206 can optionally be used as inputs to a response recommendation process such as illustrated for example in FIG. 10. The response recommendation process can be adapted to recommend a future response, by a user of the multiple users 210, 212, 214, 216, to a future security incident as described herein.

FIG. 11 is a flow diagram that illustrates an example method performed in connection with training of a user-based response recommendation engine, in accordance with various aspects of the technologies disclosed herein. In an example embodiment, the illustrated method can be performed at a server computer 700 comprising security system(s) 200 such as illustrated in FIG. 2. Alternatively, training can optionally be performed at a different computing device outside of the security system(s) 200.

At operation 1102, the security system(s) 200 can obtain historical incident data, e.g., from incident data 131, associated with previous security incidents 170 affecting a network 100. In some embodiments, the historical incident data can comprise or can be used to generate a respective incident feature vector associated with each respective previous security incident of the previous security incidents 170. The respective incident feature vectors can comprise, e.g., binary vectors including representations of security incident descriptions.

At operation 1104, the security system(s) 200 can obtain first historical user response data, e.g., from the user response data 132. The first historical user response data can be associated with a first user of the security system(s) 200, e.g., user 214. The first historical user response data can comprise indications of previous responses by the first user 214 to the previous security incidents obtained at operation 1102. In some embodiments, the first historical user response data can comprise or can be used to generate a first historical user response feature vector associated with the first user 214.

At operation 1106, the security system(s) 200 can obtain second historical user response data, e.g., from the user response data 132. The second historical user response data can be associated with a second user of the security system(s) 200, e.g., user 216. The second historical user response data can comprise indications of previous responses by the second user 216 to the previous security incidents obtained at operation 1102. In some embodiments, the second historical user response data can comprise or can be used to generate a second historical user response feature vector associated with the second user 216.

At operation 1108, the security system(s) 200 can use the historical incident data obtained at operation 1102, the first historical user response data obtained at operation 1104, and the second historical user response data obtained at operation 1106 to train a supervised machine learning model, thereby generating a trained supervised machine learning model such as the user-based response recommendation engine 220.

The user-based response recommendation engine 220 can be configured to predict, based on subsequently acquired incident data such as incident data 251, 252, or 253, and third historical user response data stored in the user response data 132, probable responses by third users of the security system(s) 200, e.g., any of users 210, 212, 214, or 216, to subsequent security incidents associated with the subsequently acquired incident data 251, 252, or 253. The probable responses predicted by the user-based response recommendation engine 220 can include, e.g., one or more of a quarantine, a system recovery, blocking an IP address, blocking a hostname, or other actions described herein.

Once the user-based response recommendation engine 220 is trained, at operation 1110 the resulting trained supervised machine learning model can be employed to predict, based on the subsequently acquired incident data 251, 252, or 253 and the third historical user response data, probable responses by the third users in order to configure response recommendations for the subsequent security incidents represented by incident data 251, 252, or 253. Operations of the user-based response recommendation engine 220 are described further with reference to FIG. 12.

FIG. 12 is a flow diagram that illustrates an example method performed in connection the use of a deployed a user-based response recommendation engine, in accordance with various aspects of the technologies disclosed herein. In an example embodiment, the illustrated method can be performed at a server computer 700 comprising security system(s) 200 such as illustrated in FIG. 2.

Prior to performing the method illustrated in FIG. 12, a supervised machine learning model can be trained, e.g., as illustrated in FIG. 11, resulting in a trained supervised machine learning model that implements the user-based response recommendation engine 220. The trained supervised machine learning model can be trained using historical user response data stored in user response data 132, and historical incident data stored associated with previous security incidents and stored in incident data 131.

At operation 1202, the security system(s) 200 can identify a security incident within the network 100, e.g., an incident represented by incident data 251. At operation 1204, the security system(s) 200 can generate a response recommendation for a user, e.g., response recommendation 226 for user 216. The response recommendation 226 can recommend a response by the user 216 to the security incident represented by incident data 251. Generating the response recommendation can comprise operations 1206, 1208, and 1210.

At operation 1206, the security system(s) 200 can obtain the incident data 251 associated with the security incident. The incident data 251 can comprise an incident feature vector, or an incident feature vector can be constructed from the incident data 251. The incident feature vector can comprise, e.g., a binary vector including a representation of a description of the security incident.

At operation 1208, the security system(s) 200 can obtain historical user response data associated with the user 216. For example, the security system(s) 200 can obtain historical user response data from user response data 132. The historical user response data can comprise indications of previous responses by the user 216 to previous security incidents, e.g., previous incidents stored in the incident data 131. In some embodiments, the historical user response data can comprise a historical user response feature vector, or a historical user response feature vector can be generated therefrom.

At operation 1210, the security system(s) 200 can predict, based on the incident data 251 and the historical user response data obtained at operation 1208, a probable response by the user 216 to the security incident, wherein the response recommendation 226 for the user 216 comprises the probable response. Predicting the probable response by the user 216 to the security incident can comprise providing the incident data 251 and the historical user response data as inputs to a trained supervised machine learning model, e.g., to the user-based response recommendation engine 220.

In some embodiments, the response recommendation 226 can include one or more of a quarantine, a system recovery, blocking an IP address, or blocking a hostname. It should be understood that the response recommendation 226 for the user 216 can be different from an alternate response recommendation 224 generated by the security system(s) 200, or an alternate response recommendation 224 that would otherwise be generated by the security system(s) 200, for an alternate user, e.g., for user 214, wherein the alternate response recommendation 224 recommends an alternate response by the alternate user 214 to the security incident.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
    identifying, by a security system within a network, a security incident within the network;
    generating, by the security system, a response recommendation for a user, wherein the response recommendation recommends a response by the user to the security incident, and wherein generating the response recommendation comprises:
        obtaining incident data associated with the security incident;
        obtaining historical user response data of the user, wherein the historical user response data comprises indications of previous responses by the user to previous security incidents; and
        predicting, based on the incident data and the historical user response data, a probable response by the user to the security incident, wherein the response recommendation for the user comprises the probable response,
        wherein predicting the probable response by the user to the security incident comprises providing the incident data and the historical user response data as two distinct inputs to a trained supervised machine learning model,
        wherein the incident data comprises an incident feature vector comprising multiple incident features, and wherein the historical user response data comprises a historical user response feature vector comprising multiple historical user response features; and
    providing an output comprising the response recommendation to the user.

2. The method of claim 1, wherein the incident feature vector comprises a binary vector including a representation of a description of the security incident.

3. The method of claim 1, further comprising using the historical user response data and historical incident data associated with previous security incidents to train the trained supervised machine learning model.

4. The method of claim 1, wherein the response recommendation includes one or more of a quarantine, a system recovery, blocking an internet protocol address, or blocking a hostname.

5. The method of claim 1, wherein the response recommendation for the user is different from an alternate response recommendation generated by the security system for an alternate user, wherein the alternate response recommendation recommends an alternate response by the alternate user to the security incident.

6. The method of claim 1, wherein the multiple incident features comprise one or more of an indication of a source of the security incident, a description of the security incident.

7. The method of claim 1, wherein the multiple historical user response features comprise one or more of the user's age, education, work experience, location, or indications of actions included in the user's historical incident responses.

8. A device comprising:
    one or more processors;
    one or more non-transitory computer-readable media storing computer-executable instructions that, when executed by the one or more processors, cause the one or more processors to perform operations comprising:
        identifying, by a security system within a network, a security incident within the network;
        generating, by the security system, a response recommendation for a user, wherein the response recommendation recommends a response by the user to the security incident, and wherein generating the response recommendation comprises:
            obtaining incident data associated with the security incident;
            obtaining historical user response data associated with the user, wherein the historical user response data comprises indications of previous responses by the user to previous security incidents; and
            predicting, based on the incident data and the historical user response data, a probable response by the user to the security incident, wherein the response recommendation for the user comprises the probable response,
            wherein predicting the probable response by the user to the security incident comprises providing the incident data and the historical user response data as two distinct inputs to a trained supervised machine learning model,
            wherein the incident data comprises an incident feature vector comprising multiple incident features, and wherein the historical user response data comprises a historical user response feature vector comprising multiple historical user response features; and
        providing an output comprising the response recommendation to the user.

9. The device of claim 8, wherein the incident feature vector comprises a binary vector including a representation of a description of the security incident.

10. The device of claim 8, wherein the operations further comprise using the historical user response data and historical incident data associated with previous security incidents to train the trained supervised machine learning model.

11. The device of claim 8, wherein the response recommendation includes one or more of a quarantine, a system recovery, blocking an internet protocol address, or blocking a hostname.

12. The device of claim 8, wherein the response recommendation for the user is different from an alternate response recommendation generated by the security system for an alternate user, wherein the alternate response recommendation recommends an alternate response by the alternate user to the security incident.

13. The device of claim 8, wherein the multiple historical user response features comprise a total number of incidents to which the user has responded in a trailing time window.

14. The device of claim 8, wherein the multiple historical user response features comprise an indication of whether the user responded to an incident from a same source as the current incident.

15. A non-transitory computer-readable medium storing computer-executable instructions that, when executed by the one or more processors, cause the one or more processors to perform operations comprising:
    identifying, by a security system within a network, a security incident within the network;
    generating, by the security system, a response recommendation for a user, wherein the response recommendation recommends a response by the user to the security incident, and wherein generating the response recommendation comprises:
        obtaining incident data associated with the security incident;

obtaining historical user response data associated with the user, wherein the historical user response data comprises indications of previous responses by the user to previous security incidents; and predicting, based on the incident data and the historical user response data, a probable response by the user to the security incident, wherein the response recommendation for the user comprises the probable response, wherein predicting the probable response by the user to the security incident comprises providing the incident data and the historical user response data as two distinct inputs to a trained supervised machine learning model, wherein the incident data comprises an incident feature vector comprising multiple incident features, and wherein the historical user response data comprises a historical user response feature vector comprising multiple historical user response features; and providing an output comprising the response recommendation to the user.

16. The non-transitory computer-readable medium of claim 15, wherein the incident feature vector comprises a binary vector including a representation of a description of the security incident.

17. The non-transitory computer-readable medium of claim 15, wherein the operations further comprise using the historical user response data and historical incident data associated with previous security incidents to train the trained supervised machine learning model.

18. The non-transitory computer-readable medium of claim 15, wherein the response recommendation includes one or more of a quarantine, a system recovery, blocking an internet protocol address, or blocking a hostname.

19. The non-transitory computer-readable medium of claim 15, wherein the response recommendation for the user is different from an alternate response recommendation generated by the security system for an alternate user, wherein the alternate response recommendation recommends an alternate response by the alternate user to the security incident.

20. The non-transitory computer-readable medium of claim 15, wherein the multiple historical user response features comprise a total number of incidents to which the user has responded in a trailing time window.

* * * * *